United States Patent Office 3,113,149
Patented Dec. 3, 1963

3,113,149
PROCESS FOR THE CONTINUOUS MANUFACTURE OF SORBIC ACID
Otto Probst, Frankfurt am Main, Hans Fernholz, Bad Soden, Taunus, and Eberhard Mundlos, Horst Oehme, and Adolf Orth, Frankfurt am Main, Germany, assignors to Farbwerke Hoechst Aktiengesellschaft vormals Meister Lucius Brüning, Frankfurt am Main, Germany, a corporation of Germany
No Drawing. Filed Jan. 6, 1960, Ser. No. 715
Claims priority, application Germany Jan. 8, 1959
7 Claims. (Cl. 260—526)

The present invention relates to a process for the continuous manufacture of sorbic acid.

It is known that sorbic acid can be prepared from crotonaldehyde and ketene via the intermediate stage of a lactone or polyester. Crotonaldehyde is reacted with the ketene at a temperature of about 0° C. in the presence of an acid catalyst, such as boron trifluoride, or at a moderately raised temperature in the presence of a dissolved fatty acid salt of a bivalent transition metal of groups 2 to 8 of the periodic table, such as iron, nickel, mercury, cobalt, cadmium or zinc. The intermediate product first obtained in these processes is directly converted into sorbic acid by means of a strong acid, if the catalyst used is boron trifluoride, or subjected to a thermal treatment or alkaline hydrolysis with subsequent acid treatment to split off the water, if the catalyst used is a fatty acid salt.

It has been found that in carrying out the reaction of crotonaldehyde with ketene in the liquid phase in the presence of a fatty acid salt of a bivalent transition metal to obtain a polyester as intermediary product a series of conditions have to be observed in order to obtain a product which in the course of further processing leads to an optimum yield of sorbic acid of high purity. The ketene, which is used in the form of a gas under the reaction conditions, is at least partially dissolved in the liquid reaction medium. The dissolving process the ketone undergoes and the reaction velocity depend on the partial pressure of the ketene. Commercially pure ketene, which can be obtained by the processes described in German Patent 958,921 and DAS 1,009,178, is therefore especially suitable for use in the process of this invention. Crude ketene of lower concentration as it is obtained by cracking acetone diluted with methane and other pyrolysis products, for example carbon monoxide and ethylene, may, however, also be used provided that the dissolving process takes place under otherwise favorable conditions. The reaction is carried out, if desired, under a slight superatmospheric pressure, for example under a pressure of up to 2 atmospheres gauge.

The present invention provides a process for the manufacture of very pure sorbic acid in semi-continuous or continuous manner, wherein a ketene is reacted at a moderately raised temperature with an excess of crotonaldehyde in the presence of an inert solvent and a fatty acid salt of a bivalent transition metal of groups 2 to 8 of the periodic table, of which the fatty acid radical contains from 4–18 carbon atoms, as the catalyst. The crotonaldehyde is cycled (main crotonaldehyde cycle) in the presence of the reaction product which it formed with the ketene, reacted at a temperature of 25–80° C. with a further quantity of ketene substantially in the absence of acetic anhydride, a partial cycle of the reaction solution so formed is derived from the main crotonaldehyde cycle, the reaction solution is treated under reduced pressure to eliminate the polyester by distillation as the reaction product, the polyester is subjected to a prolonged heat treatment, and then converted in known manner into sorbic acid. The process of this invention can be carried out using the substances specified in U.S. patent application S.N. 662,968, filed June 3, 1957, now U.S. Patent 3,021,365, as the catalyst or solvent and the polyester obtained as the reaction product can be converted into sorbic acid using the process described in said application or in U.S. patent application S.N. 783,198, filed December 29, 1958, now U.S. Patent 3,022,342. There may be used, for example, the salts of the above metals with butyric acid, isobutyric acid, valeric acid, isovaleric acid, α-methylbutyric acid, diethylacetic acid, caproic acid, caprylic acid, capric acid, lauric acid, 2-ethylcaproic acid, stearic acid, palmitic acid, oleic acid. The catalyst is used, for example, in a proportion of between 0.1% and 5%, calculated on the weight of crotonaldehyde used.

In carrying out the process of this invention, it is advantageous to introduce the ketene into a column filled with filling material whereby the crotonaldehyde is intensely contacted with ketene. The ketene is absorbed in the reaction solution which is repumped to govern the exothermal reaction and passed through a heat exchanger and then reacted with the crotonaldehyde, the reaction being initiated by the dissolved catalyst. It is especially advantageous to carry out the reaction at a temperature within the range of 40–60° C. in view of the fact that the reaction velocity diminishes at a temperature below this range. The decrease of the reaction velocity can be counteracted by known measures, i.e. by increasing the reaction volume to prolong the time of stay of the gas in the column or increasing the rate of liquid cycled. These measures are, however, confined to certain limits so that it is advantageous to work at temperatures above 25° C. Working above 80° C. is associated with a decrease in quality of the reaction product. The reaction is advantageously carried out using a certain excess of crotonaldehyde in order that the gas issuing from the reactor be free from ketene. The excess of crotonaldehyde used, that is the quantity of crotonaldehyde contained in the solution which leaves the reaction zone, should amount to at least 3% by weight, advantageously at least 5% by weight, calculated on the reaction liquid, and preferably should not substantially exceed 35% by weight, since the use of too great an amount of aldehyde involves the risk of secondary reactions yielding sorbic acid which is dark colored by by-products and, therefore, difficult to purify.

It is understood that the crotonaldehyde to undergo reaction with ketene should be used in fairly anhydrous form. The dehydration by distillation of commercial hydrous crotonaldehyde leads, however, to a product which still contains a minor proportion of water, generally up to about 0.6% by weight. This amount of water together with a further quantity of water which may possibly derive from chemical side-reactions, is reacted with ketene and converted via the stage of acetic acid into acetic anhydride. The reaction of crotonaldehyde with ketene is often considerably retarded with the formation of a reaction product which can be converted into sorbic acid to an unsatisfactory extent only. The reason for this disturbed course of reaction is seen in the presence of the acetic anhydride which makes the catalyst inactive. It is therefore necessary to eliminate the anhydride at the same rate as it is formed so that the admissible concentration of anhydride does not generally exceed about 1% by weight, calculated on the reaction solution.

In the process of this invention one or several inert solvents, for example benzene, toluene, xylene, methylene chloride, chlorobenzene or nitrobenzene, are added to the reaction medium in order to reduce its viscosity. The relatively thinly liquid reaction solution is conducted, for example, through a column filled with filling material in counter-current with the ketene-containing gas.

To isolate the reaction products, separate and recover the crotonaldehyde in excess and the inert solvent, part of the reaction solution is conducted, advantageously under reduced pressure, for example 30–100 mm. of mercury, through a continuously operating distillation column. The catalyst remains in the reaction product formed in the sump of the column and is withdrawn together with the reaction product. The distillate consists of 45–25% crotonaldehyde and 55–75% solvent, for example toluene, and includes a minor proportion of acetic anhydride. If this distillate is intended to be again introduced into the reaction column without losses occurring and without being separated into its components, the distillation has to be carried out under conditions under which the acetic anhydride is substantially retained in the sump of the column and can be there removed. In this manner, a low concentration of acetic anhydride can be maintained in the reactor without difficulty and disturbances in the course of the reaction can be avoided.

The known process sometimes involves the formation of by-products which penetrate into the sorbic acid from which they cannot be removed by conventional distillation or crystallization or can only be removed with high expenditure of energy. In spite of combined purification processes the sorbic acid obtained in these processes is colored and cannot be used for the preservation of food due to deficiencies as regards odor and taste.

These difficulties can be overcome in simple manner by exposing the polyester, for example in the form of a solution, for a prolonged time to the action of a raised temperature. Following the evaporation of the mixture of crotonaldehyde and inert solvent, the polyester is advantageously passed continuously, for example for a period of between 30 minutes and 4 hours or advantageously 1 and 3 hours, through a tube heated to a temperature of 80–150° C., preferably 105–125° C. This after-heating may also take place before or during the distillative separation of the mixture of crotonaldehyde and inert solvent, if desired under superatmospheric pressure. The further work up of a thermally after-treated polyester by thermal splitting or alkaline hydrolysis and subsequent acid water separation gives an optimum yield of sorbic acid. The acid so obtained may be further purified by known methods, such as distillation and/or crystallization, whereby an optimum yield of sorbic acid of high purity is obtained with little expenditure of energy.

The following example serves to illustrate the invention, but not intended to limit it thereto:

Example (A) 200 parts of a solution consisting of 90 parts of a polyester, 40 parts crotonaldehyde, 68.5 parts toluene and 1.5 parts acetic anhydride were cycled from above through a reaction column filled with Raschig rings. The polyester used was the product obtained by reacting ketene with crotonaldehyde under the reaction conditions specified in this example. At the head of the column 68.5 parts crotonaldehyde containing 0.4 part dissolved zinc isobutyrate as the catalyst, and 49.1 parts toluene were added at a temperature of 55° C. to the cycled solution, while 24 parts gaseous ketene were simultaneously introduced in counter-current at the foot of the column. The ketene reacted substantially quantitatively with 40 parts crotonaldehyde. The gas issuing at the head of the column contained less than 1% ketone. 200 parts of the product leaving at the foot of the column were reintroduced via a heat exchanger into the head of the reaction column in order to dissipate the reaction heat. The remaining 142 parts of product were withdrawn and distilled. Continuous distillation over a column under a pressure of 70 mm. of mercury yielded 64.3 parts of reaction product (sump product) which substantially consisted of a polyester, and as distillate a mixture consisting of 49.1 parts toluene and 28.4 parts crotonaldehyde containing about 0.2 part acetic anhydride. The mixture could be added to the cycled product before the inlet of the column. The sump product was continuously withdrawn and maintained for about 2 hours at 115° C. in a heatable vessel. The 64.3 parts of reaction product so aftertreated which consisted substantially of a polyester could be thermally split or subjected to alkaline hydrolysis with subsequent splitting off of water in an acid medium to yield 55.5 parts of crystalline crude sorbic acid of 89.5% strength and light yellow coloration. The sorbic acid so obtained was further purified by distillation and crystallization to give an absolutely colorless sorbic acid satisfactory with respect to taste and odor.

(B) 200 parts of a solution consisting of 90 parts polyester, 40 parts crotonaldehyde, 63 parts toluene and 7 parts acetic anhydride were cycled in the manner described (sub A) with the exception that the same amounts of crotonaldehyde, catalyst and toluene were added to the solution before the inlet of the column as described (sub item A). Only 25 parts crotonaldehyde underwent reaction with 15 parts ketene. The gas issuing at the head of the column contained 9 parts of unreacted ketene, which corresponds to about 65% by volume when 88% ketene is used. Due to the lower degree of crotonaldehyde conversion, the 200 parts of cycled product leaving the reactor contained only 78 parts polyester but 50 parts crotonaldehyde. In other words, a depletion of polyester occurred while the content of crotonaldehyde was increased. 200 parts of the cycled product were returned to the reactor and 133 parts were withdrawn for distillation. The distillate obtained without using a column consisted of 44.8 parts toluene, 33.4 parts crotonaldehyde and 2 parts acetic anhydride while 52.8 parts of reaction product containing the polyester were obtained as sump product. The sump product was thermally after-treated and worked up in the manner described (sub A) to yield only 35.5 parts of a 85% crystalline crude sorbic acid which contained smeary and dark colored impurities.

(C) The reaction of crotonaldehyde with ketene was carried out under the conditions specified (sub A) with the exception that the reaction product containing the polyester was withdrawn as sump product from the distilling apparatus without having been after-heated and subjected to thermal splitting or alkaline hydrolysis followed by splitting off of water. Crude sorbic acid of 88.5% strength was obtained. The acid was further purified by distillation and crystallization but still contained unseparable accompanying substances. The sorbic acid obtained as end product had a greenish coloration, bad taste and odor.

We claim:

1. A process for the manufacture of sorbic acid which comprises (I) introducing (a) ketene, (b) an excess of crotonaldehyde, (c) an inert solvent, and (d) a salt of a bivalent transition metal of groups II to VIII of the periodic table of the group consisting of iron, nickel, mercury, cobalt, cadmium and zinc, with a fatty acid of 4 to 18 carbon atoms, as catalyst, into a reaction zone at a temperature within the range of 25 to 80° C. to form a reaction mixture comprising a polyester reaction product, acetic anhydride formed as a by-product, from 3% to 35% by weight, calculated on the reaction liquid, of unreacted excess crotonaldehyde, inert solvent and catalsyt, (II) recycling a portion of the reaction mixture to said reaction zone, (III) separating the remainder of the reaction mixture by distillation into (a) a liquid fraction containing (1) polyester formed as a reaction product of crotonaldehyde and ketene, (2) acetic anhydride, and (3) catalyst, and (b) a gaseous fraction containing (1) the unreacted crotonaldehyde and (2) inert solvent in said remainder, (IV) condensing the gaseous fraction obtained in step (III), (V) recycling the condensate thus obtained to the reaction zone, maintaining the percentage of acetic anhydride recycled to the reaction zone at no more than about 1% by weight, calculated on the reaction solution, and (VI) treating the liquid fraction of step (III) (a) with an alkaline agent for converting the polyester into sorbic acid.

2. The process of claim 1, wherein the temperature in the reaction zone is maintained in the range of from 40 to 60° C.

3. The process of claim 1 wherein the inert solvent is a member of the group consisting of benzene, toluene, xylene, methylene chloride, chlorobenzene and nitrobenzene.

4. The process of claim 3 wherein the inert solvent is toluene.

5. The process of claim 1 wherein the distillation is carried out under a reduced pressure in the range from 30 to 100 millimeters of mercury.

6. The process of claim 1 wherein the polyester prior to its treatment with an alkaline reagent is heated for 30 minutes to 4 hours to a temperature in the range from 80 to 150° C.

7. The process of claim 1 wherein the polyester prior to its treatment with an alkaline reagent is heated for 1–3 hours to a temperature in the range from 105 to 125° C.

References Cited in the file of this patent

FOREIGN PATENTS 1,042,573   Germany _____ Nov. 6, 1958